US006711221B1

(12) United States Patent
Belotserkovsky et al.

(10) Patent No.: US 6,711,221 B1
(45) Date of Patent: Mar. 23, 2004

(54) SAMPLING OFFSET CORRECTION IN AN ORTHOGONAL FREQUENCY DIVISION MULTIPLEXING SYSTEM

(75) Inventors: Maxim B. Belotserkovsky, Indianapolis, IN (US); Louis Robert Litwin, Jr., Carmel, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/505,159

(22) Filed: Feb. 16, 2000

(51) Int. Cl.[7] .............................. H04L 7/00; H04L 27/06
(52) U.S. Cl. ...................... 375/355; 375/343; 375/363
(58) Field of Search .................................. 375/343, 355, 375/130, 147, 260, 222, 362–366, 368, 354; 370/208, 210, 503, 509, 510–514

(56) References Cited

U.S. PATENT DOCUMENTS

| | | | |
|---|---|---|---|
| 5,444,697 A | 8/1995 | Leung et al. | 370/19 |
| 5,608,764 A | 3/1997 | Sugita et al. | 375/344 |
| 5,652,772 A | 7/1997 | Isaksson et al. | 375/367 |
| 5,694,389 A | 12/1997 | Seki et al. | 370/208 |
| 5,710,792 A | 1/1998 | Fukawa et al. | 375/229 |
| 5,726,974 A | 3/1998 | Kunieda et al. | 372/206 |
| 5,732,113 A | 3/1998 | Schmidl et al. | 375/355 |
| 5,771,224 A | 6/1998 | Seki et al. | 370/206 |
| 5,774,450 A | 6/1998 | Harada et al. | 370/206 |
| 5,787,123 A | 7/1998 | Okada et al. | 375/324 |
| 5,790,516 A | 8/1998 | Gudmundson et al. | 370/210 |
| 5,812,523 A | 9/1998 | Isaksson et al. | 370/208 |
| 5,818,813 A | * 10/1998 | Saito et al. | 370/208 |
| 5,920,598 A | 7/1999 | Hyakudai et al. | 375/316 |
| 6,074,086 A | * 6/2000 | Yonge, III | 708/422 |
| 6,111,919 A | * 8/2000 | Yonge, III | 375/260 |
| 6,459,745 B1 | * 10/2002 | Moose et al. | 375/355 |
| 6,546,056 B1 | * 4/2003 | Rosenlof | 375/260 |

FOREIGN PATENT DOCUMENTS

WO WO 99/27671 6/1999 ............ H04J/11/00

OTHER PUBLICATIONS

H.Nogami et al., "A Frequency and Timing Period Acquisition Technique for OFDM Systems", The Sixth IEEE International Symposium on Personal, Indoor and Mobile Radio Communications, PIMRC'95, Toronto, Canada, Sep. 27–29, 1995, pp. 1010–1015.

J. Rinne et al., "An Equalization Method For Orthogonal Frequency Division Multiplexing Systems In Channels With Multipath Propagation, Frequency Offset And Phase Noise", IEEE GLOBECOM 1996, London, Nov. 18–22, 1996, Conference Record Volume 2 of 3, pp. 1442–1446.

J. A. C. Bingham, "Multicarrier Modulation For Data Transmission: An Idea Whose Time Has Come", May 1990—IEEE Communications Magazine.

J. A. Cioffi, "A Multicarrier Primer" (Tutorial), Amati Communications Corporation and Stanford University, pp. 1–18.

D. K. Kim et al., "A New Joint Algorithm Of Symbol Timing Recovery and Sampling Clock Adjustment For OFDM Systems", IEEE Transactions on Consumer Electronics, vol. 44, No. 3, Aug. 1998, pp. 1142–1149.

W. Bretl et al., "VSB Modem Subsystem Design For Grand Alliance Ditital Television Receivers", IEEE Transactions on Consumer Electronics, vol. 41, No. 3, Aug. 1995, pp. 773–786.

* cited by examiner

Primary Examiner—Tesfaldet Bocure
(74) Attorney, Agent, or Firm—Joseph S. Tripoli; Ronald H. Kurdyla; Vincent E. Duffy (57) ABSTRACT

An Orthogonal Frequency Division Multiplexing (OFDM) receiver detects and corrects sampling offsets in the time domain. The OFDM receiver oversamples a training sequence or symbol in a received OFDM signal, correlates the oversampled training sequence with a stored copy of a truncated version of the training sequence, locates a correlation peak, and derives a sampling offset by calculating a difference in magnitude of correlation samples in the vicinity of the correlation peak.

21 Claims, 6 Drawing Sheets

SAMPLING OFFSET CORRECTION IN AN ORTHOGONAL FREQUENCY DIVISION MULTIPLEXING SYSTEM

FIELD OF THE INVENTION

The present invention relates to processing orthogonal frequency division multiplexed (OFDM) signals.

BACKGROUND OF THE INVENTION

Orthogonal frequency division multiplexing (OFDM) is a robust technique for efficiently transmitting data over a channel. The technique uses a plurality of sub-carrier frequencies (sub-carriers) within a channel bandwidth to transmit the data. These sub-carriers are arranged for optimal bandwidth efficiency compared to more conventional transmission approaches, such as frequency division multiplexing (FDM), which waste large portions of the channel bandwidth in order to separate and isolate the sub-carrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier.

The transmission of data through a channel via OFDM signals provides several advantages over more conventional transmission techniques. One advantage is a tolerance to multipath delay spread. This tolerance is due to the relatively long symbol interval Ts compared to the typical time duration of the channel impulse response. These long symbol intervals prevent inter-symbol interference (ISI). Another advantage is a tolerance to frequency selective fading. By including redundancy in the OFDM signal, data encoded onto fading sub-carriers can be reconstructed from the data recovered from the other sub-carriers. Yet another advantage is efficient spectrum usage. Since OFDM subcarriers are placed in very close proximity to one another without the need to leave unused frequency space between them, OFDM can efficiently fill a channel. A further advantage is simplified sub-channel equalization. OFDM shifts channel equalization from the time domain (as in single carrier transmission systems) to the frequency domain where a bank of simple one-tap equalizers can individually adjust for the phase and amplitude distortion of each sub-channel. Yet another advantage is good interference properties. It is possible to modify the OFDM spectrum to account for the distribution of power of an interfering signal. Also, it is possible to reduce out-of-band interference by avoiding the use of OFDM sub-carriers near the channel bandwidth edges.

Although OFDM exhibits these advantages, prior art implementations of OFDM also exhibit several difficulties and practical limitations. One difficulty is the issue of synchronizing the transmitter's sample rate to the receiver's sample rate to eliminate sampling rate offset. Any mis-match between these two sampling rates results in a rotation of the $2^m$-ary sub-symbol constellation from symbol to symbol in a frame for smaller frequency offsets. However, for larger frequency offsets, the result is a contraction or expansion of the frequency spectrum of the received signal. Both of these can contribute to increased BER. One cause of sampling rate offset is the presence of a sampling frequency offset. A sampling frequency offset occurs when the receiver samples the received signal at a frequency that is either higher or lower than the sample rate used at the transmitter. Another cause of sampling rate offset is the presence of a sampling phase offset. A sampling phase offset occurs when the receiver samples the received signal at a phase offset from sample rate of the transmitter. Both the sampling frequency and sampling phase offsets can be detrimental to the performance of the receiver, and must be corrected for in order for the receiver to be properly synchronized. The present invention is directed to the correction of this problem.

SUMMARY OF THE INVENTION

An Orthogonal Frequency Division Multiplexing (OFDM) receiver detects and corrects sampling offsets in the time domain. The OFDM receiver oversamples a training sequence or symbol in a received OFDM signal, correlates the oversampled training sequence with a stored copy of a truncated version of the training sequence, locates a correlation peak, and derives a sampling offset by calculating a difference in magnitude of correlation samples in the vicinity of the correlation peak.

DETAILED DESCRIPTION OF THE PREFERRED EMBODIMENT

The characteristics and advantages of the present invention will become more apparent from the following description, given by way of example.

Figure 1:
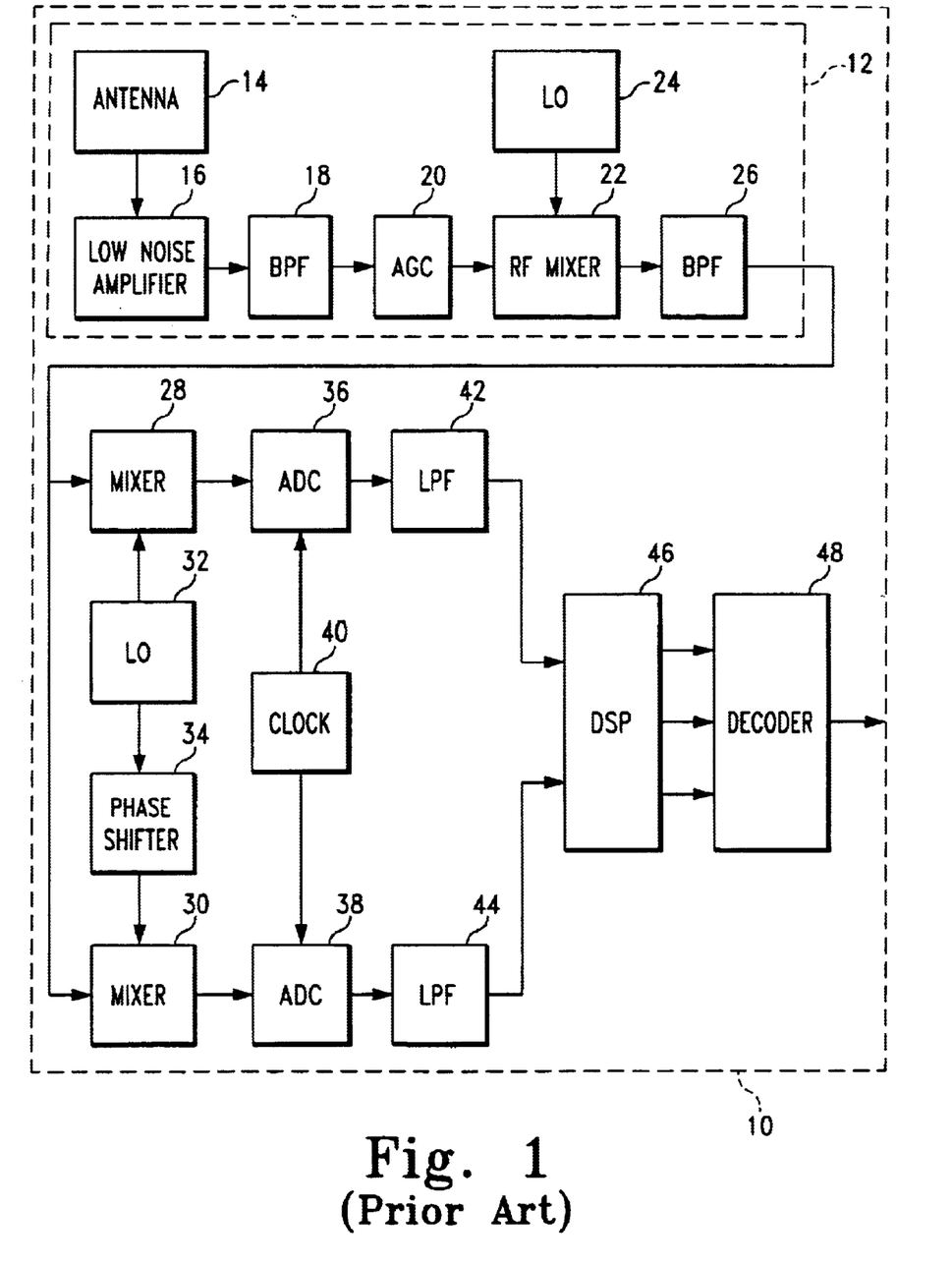
FIG. 1 is a block diagram of a conventional OFDM receiver.

Referring to FIG. 1, the first element of a typical OFDM receiver 10 is an RF receiver 12. Many variations of RF receiver 12 exist and are well known in the art, but typically, RF receiver 12 includes an antenna 14, a low noise amplifier (LNA) 16, an RF bandpass filter 18, an automatic gain control (AGC) circuit 20, an RF mixer 22, an RF carrier frequency local oscillator 24, and an IF bandpass filter 26.

Through antenna 14, RF receiver 12 couples in the RF OFDM-modulated carrier after it passes through the channel. Then, by mixing it with a receiver carrier of frequency $f_{cr}$ generated by RF local oscillator 24, RF receiver 12 downconverts the RF OFDM-modulated carrier to obtain a received IF OFDM signal. The frequency difference between the receive carrier and the transmit carrier contributes to the carrier frequency offset, delta $f_c$.

This received IF OFDM signal then feeds into both mixer 28 and mixer 30 to be mixed with an in-phase IF signal and a 90° phase-shifted (quadrature) IF signal, respectively, to produce in-phase and quadrature OFDM signals, respectively. The in-phase IF signal that feeds into mixer 28 is produced by an IF local oscillator 32. The 90° phase-shifted IF signal that feeds into mixer 30 is derived from the in-phase IF signal of IF local oscillator 32 by passing the in-phase IF signal through a 90° phase shifter 34 before feeding it to mixer 30.

The in-phase and quadrature OFDM signals then pass into analog-to-digital converters (ADCs) 36 and 38, respectively, where they are digitized at a sampling rate $f_{ck\_r}$ as determined by a clock circuit 40. ADCs 36 and 38 produce digital samples that form an in-phase and a quadrature discrete-time OFDM signal, respectively. The difference between the sampling rates of the receiver and that of the transmitter is the sampling rate offset, delta $f_{ck} = f_{ck\_r} - f_{ck\_t}$.

The unfiltered in-phase and quadrature discrete-time OFDM signals from ADCs 36 and 38 then pass through digital low-pass filters 42 and 44, respectively. The output of lowpass digital filters 42 and 44 are filtered in-phase and quadrature samples, respectively, of the received OFDM signal. In this way, the received OFDM signal is converted into in-phase ($q_i$) and quadrature ($p_i$) samples that represent the real and imaginary-valued components, respectively, of the complex-valued OFDM signal, $r_i = q_i + jp_i$. These in-phase and quadrature (real-valued and imaginary-valued) samples of the received OFDM signal are then delivered to DSP 46. Note that in some conventional implementations of receiver 10, the analog-to-digital conversion is done before the IF mixing process. In such an implementation, the mixing process involves the use of digital mixers and a digital frequency synthesizer. Also note that in many conventional implementations of receiver 10, the digital-to-analog conversion is performed after the filtering.

DSP 46 performs a variety of operations on the in-phase and quadrature samples of the received OFDM signal. These operations may include: a) synchronizing receiver 10 to the timing of the symbols and data frames within the received OFDM signal, b) removing the cyclic prefixes from the received OFDM signal, c) computing the discrete Fourier transform (DFT) or preferably the fast Fourier transform (FFT) of the received OFDM signal in order to recover the sequences of frequency-domain sub-symbols that were used to modulate the sub-carriers during each OFDM symbol interval, d),performing any required channel equalization on the sub-carriers, and e) computing a sequence of frequency-domain sub-symbols, $y_k$, from each symbol of the OFDM signal by demodulating the sub-carriers of the OFDM signal by means of the FFT calculation. DSP 46 then delivers these sequences of sub-symbols to a decoder 48.

Decoder 48 recovers the transmitted data bits from the sequences of frequency-domain sub-symbols that are delivered to it from DSP 46. This recovery is performed by decoding the frequency-domain sub-symbols to obtain a stream of data bits which should ideally match the stream of data bits that were fed into the OFDM transmitter. This decoding process can include soft Viterbi decoding and/or Reed-Solomon decoding, for example, to recover the data from the block and/or convolutionally encoded sub-symbols.

Figure 2:
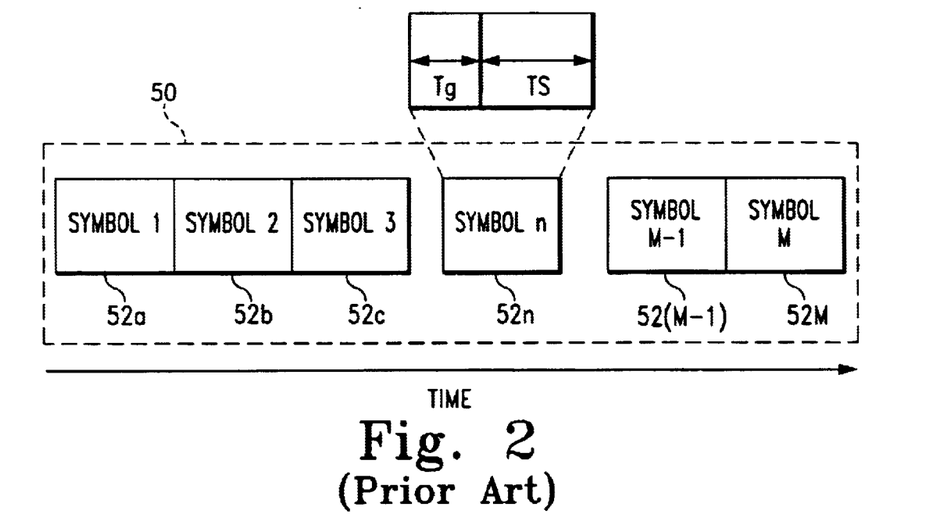
FIG. 2 illustrates a typical arrangement of OFDM symbols and their corresponding guard intervals within a data frame.

In a typical OFDM data transmission system such as one for implementing digital television or a wireless local area network (WLAN), data is transmitted in the OFDM signal in groups of symbols known as data frames. This concept is shown in FIG. 2 where a data frame 50 includes M consecutive symbols 52a, 52b, . . . , 52M, each of which includes a guard interval, $T_g$, as well as the OFDM symbol interval, Ts. Therefore, each symbol has a total duration of $T_g + T_s$ seconds. Depending on the application, data frames can be transmitted continuously, such as in the broadcast of digital TV, or data frames can be transmitted at random times in bursts, such as in the implementation of a WLAN.

Figure 3:
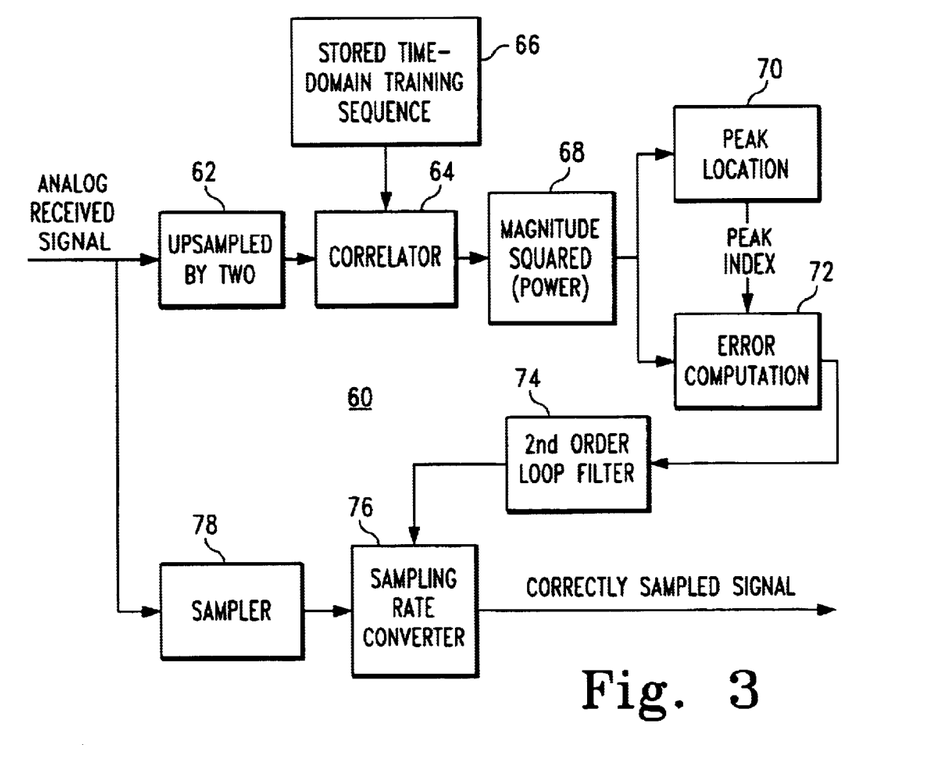
FIG. 3 is a block diagram of an exemplary sampling offset correction system of the present invention.
Figure 5:
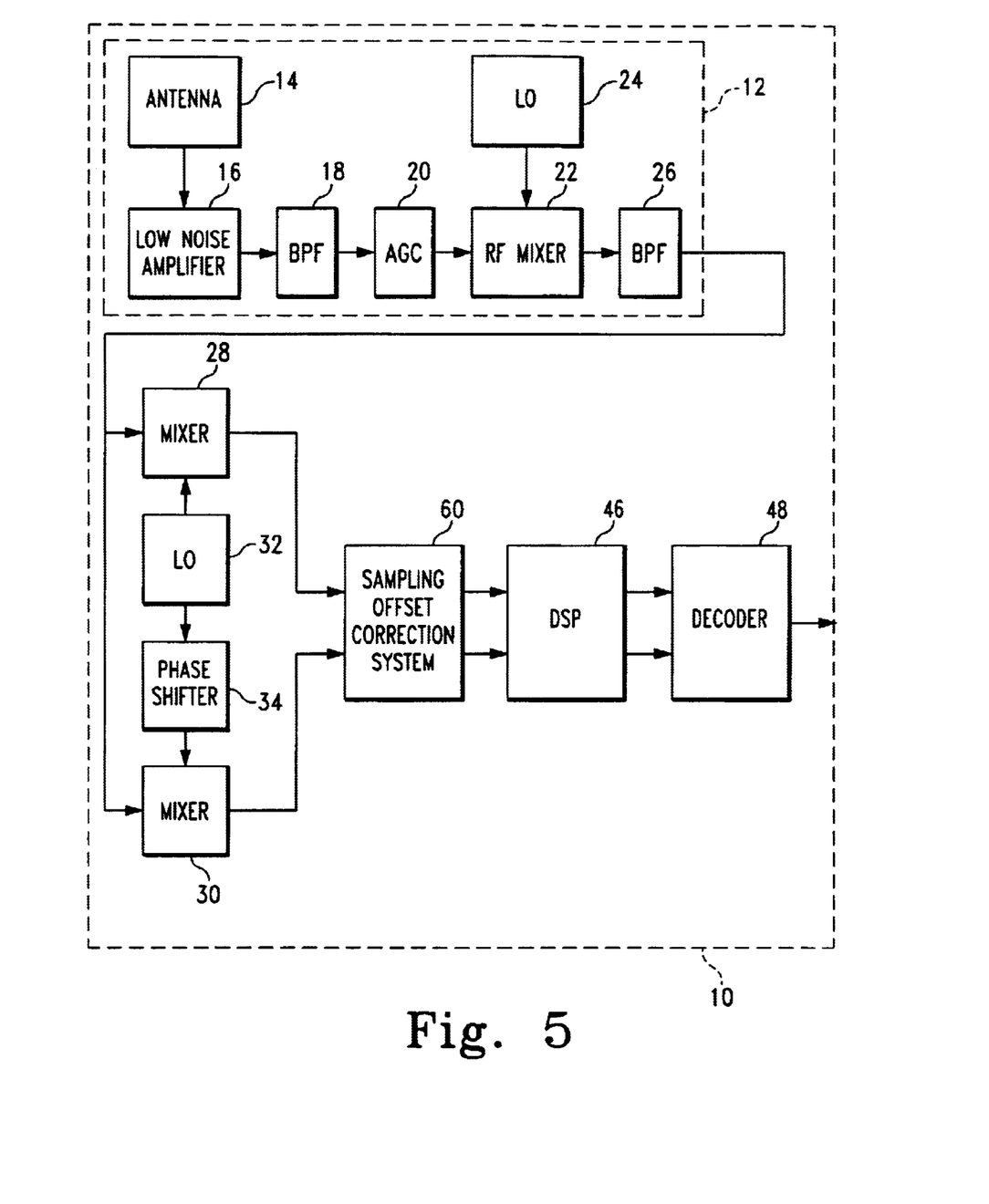
FIG. 5 is a block diagram illustrating the present invention as integrated with the conventional OFDM receiver of FIG. 1.

Referring now to FIG. 3, an exemplary embodiment of the present invention is shown. The FIG. 3 arrangement may be employed in the receiver of FIG. 1, as illustrated in FIG. 5. However, the present invention is illustrated as a distinct sampling offset correction loop for clarity, ease of reference, and to facilitate an understanding of the present invention.

The present invention operates in a receiver that conforms to the proposed ETSI-BRAN HIPERLAN/2 (Europe) and IEEE 802.11a (USA) wireless LAN standards, herein incorporated by reference. However, it is considered within the skill of one skilled in the art to implement the teachings of the present invention in other OFDM systems.

Figure 6:
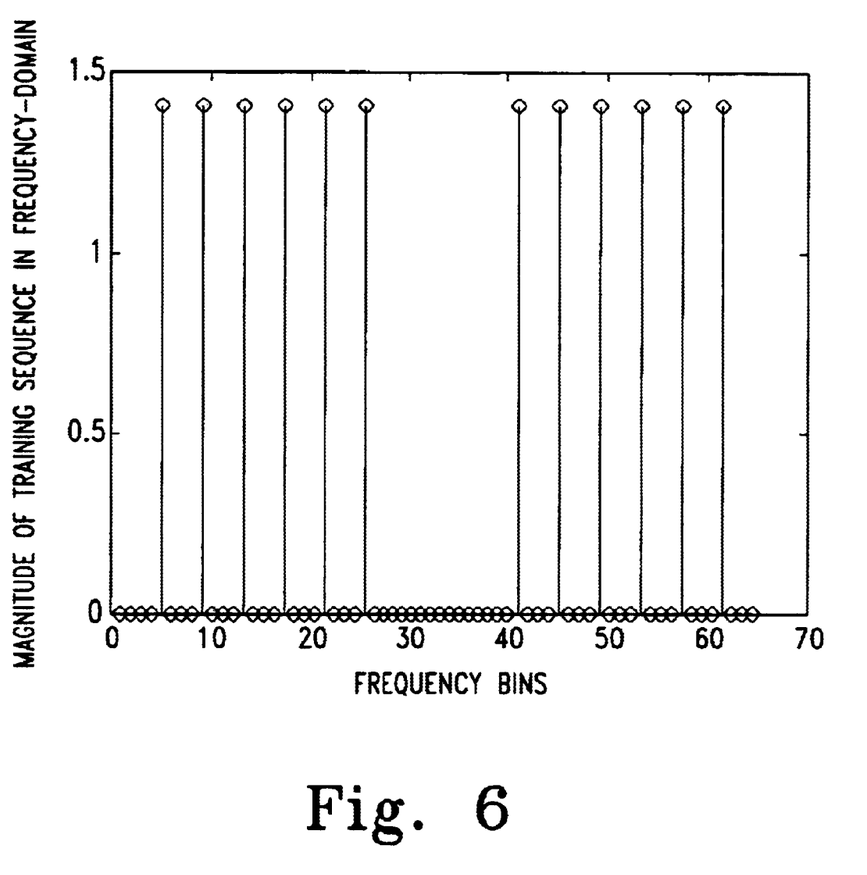
FIG. 6 is a diagram of an exemplary training sequence in the frequency domain.
Figure 7:
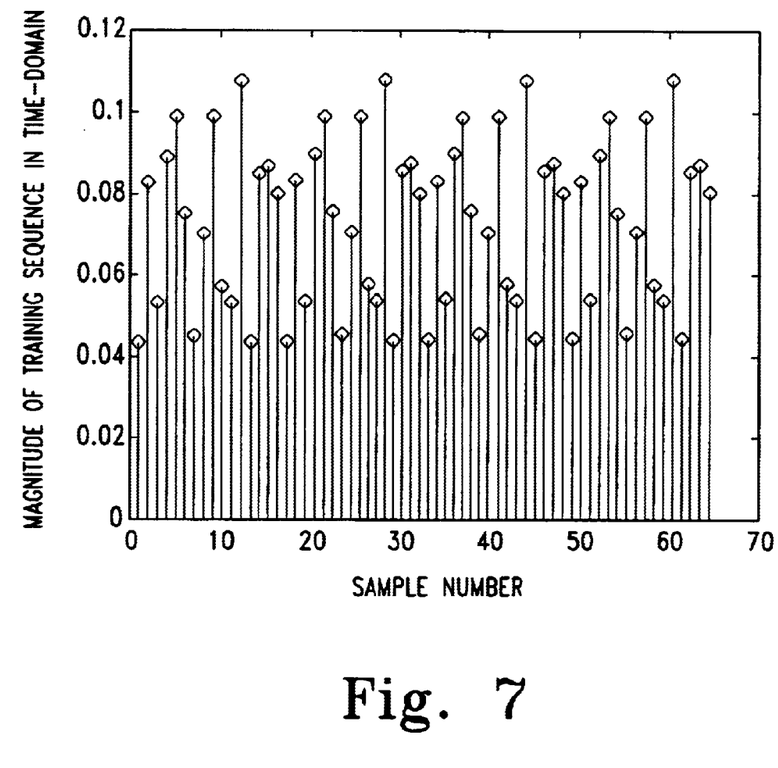
FIG. 7 is a time domain representation of the training sequence of FIG. 6.

The above-identified wireless LAN standards propose the use of a training sequence for detection of OFDM transmissions. The training sequence (e.g., training sequence A or B) includes a series of short OFDM training symbols (having known amplitudes and phases) that are transmitted over a pre-determined number of pilot sub-carriers or bins (e.g., 12 pilot sub-carriers). All the other sub-carriers (e.g., 52 sub-carriers) remain at zero during the transmission of the training sequence. Although use of the training sequence of the above-identified LAN standards is discussed, use of alternative training sequences and symbols is considered within the scope of the invention as defined by the appended claims. Frequency domain and time domain representations of an exemplary training sequence B of HIPERLAN/2 are shown in FIGS. 5 and 6. As shown in FIG. 6, the training sequence has a block of 16 samples that is repeated 4 times per training symbol. This repetitive block or time period is utilized by the present invention, as discussed in further detail below.

Returning now to FIG. 3, a sampling offset correction system 60 is shown. It should be noted that system 60 may be embodied in software, hardware, or some combination thereof. A pair of samplers (e.g., ADCs) 62 and 78 sample a received OFDM signal. As discussed above, the received OFDM signal contains in-phase ($q_i$) and quadrature ($p_i$) portions that represent the real and imaginary-valued components, respectively, of the complex-valued OFDM signal, $r_i = q_i + jp_i$. Sampler 78 samples the OFDM signal at a given sample rate (selected to be near the sampling rate of the transmitter) and passes the sampled OFDM signal through a sampling rate converter 76 for downstream processing (e.g., FFT and the like), as discussed in further detail below. Sampler 62 upsamples or oversamples the received OFDM signal by a predetermined factor (e.g., a factor of 2) and passes the upsampled signal to a correlator module 64. Oversampling the received OFDM signal provides a resolution of the OFDM signal that is necessary to derive a meaningful error, as discussed in further detail below. It should be noted that sampler 78 and sampler 62 may be interconnected in a number of different ways, as known by one skilled in the art. For example, sampler 78 and sampler 62 may be driven by a clock circuit (not shown) that drives both samplers 78 and 62 to oversample the OFDM signal by a factor of 2. In this case, sampler 62 would pass every sample to a correlator module 64 and sampler 78 would pass every other sample to sampling rate converter 76.

Correlator module 64 correlates the upsampled signal received from sampler 62 with time-domain samples of the training sequence (e.g., training sequence B of the above-mentioned wireless standards) stored in a local memory 66. Each sample in the exemplary training sequence has a value of sqrt(13/6)*[(1+j) or (−1−j)]. The memory allocated for storing each sample value will depend on the design of a particular OFDM receiver. The stored version of the training sequence is, preferably, a truncated version of the training sequence corresponding to one of the repetitive blocks of samples (e.g., 16 samples) of training sequence B. More specifically, the stored version of the truncated training sequence, preferably, corresponds to an oversampled version (e.g., 32 samples) of the repetitive block that is oversampled by the same predetermined factor (e.g., a factor of 2) as used in sampler 62. By only storing a truncated, albeit oversampled, version of the training sequence, memory space is efficiently utilized in local memory 66 since the entire training sequence (i.e., 64 samples if the training sequence is not oversampled) is not stored in local memory 66.

A maximum correlation will occur between the oversampled OFDM signal and the truncated version of the training sequence when the stored training sequence coincides with a training sequence contained in the OFDM signal. Thus, a peak in the power of the correlation output may be utilized to determine when the received signal coincides with the stored training sequence.

The output of correlator module 64 is a complex signal since the inputs (i.e., the stored training sequence and the OFDM signal) are complex. Power module 68 may compute the power or magnitude of each sample of the correlated signal in one of two ways in accordance with the design of a particular OFDM receiver. First, power module 68 may compute the squared magnitude (i.e., the power) of each complex sample of the correlated signal to generate a real number indicating the power of the correlated signal. Second, power module 68 may obtain the magnitude (as opposed to the squared magnitude) of each complex sample of the correlated signal.

A peak locator module 70 searches the correlation power sequence output from power module 68 in order to locate the sample in the correlation power sequence having the largest power or magnitude value. Once the largest value is identified, peak locator module 70 outputs the index of the peak location to an error computation module 72. The index is used by error computation module 72 as a reference point.

Figure 4:
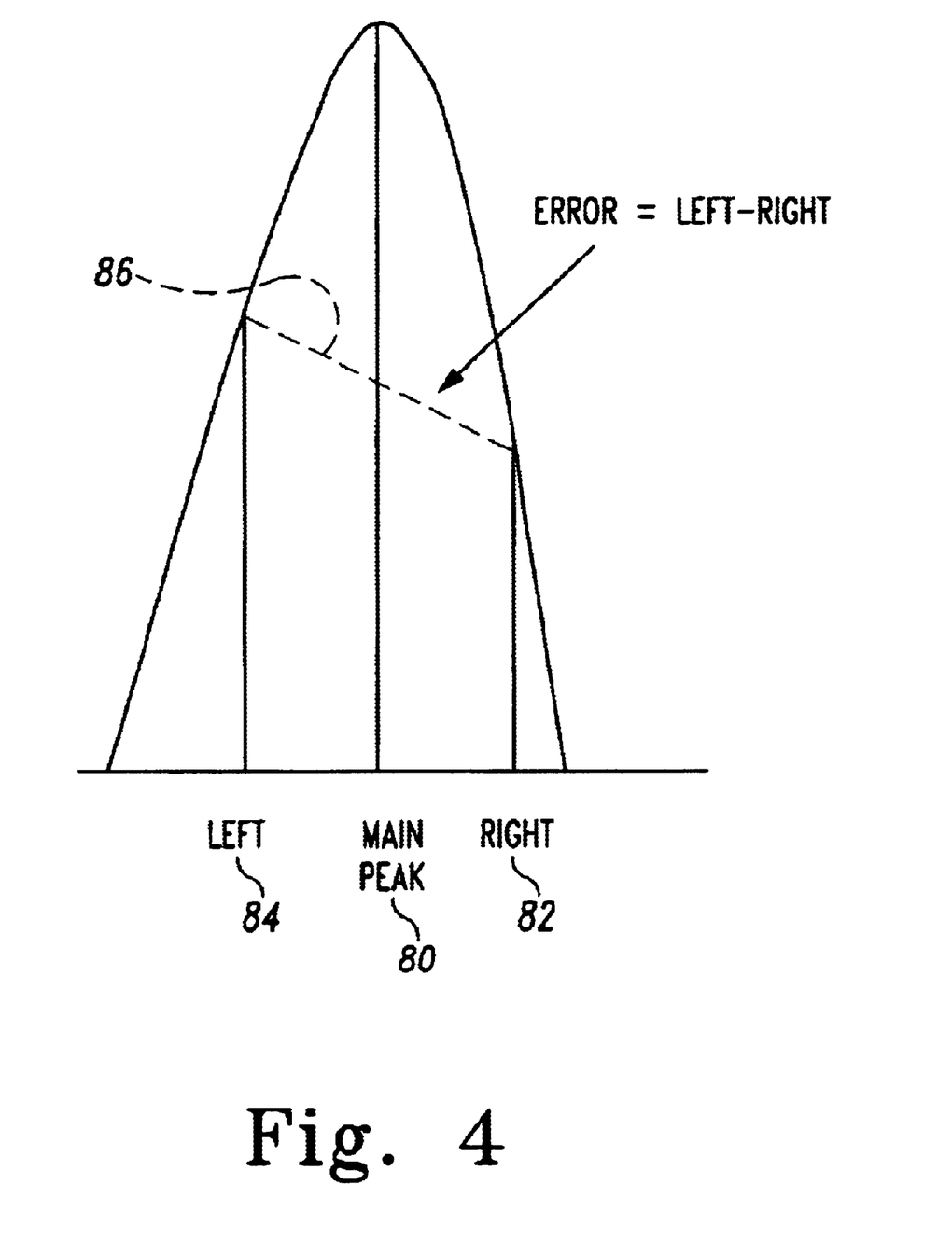
FIG. 4 is an illustration of a correlation power peak when there is a sampling offset (phase and/or frequency)

As discussed above, oversampling the OFDM signal increases the number of correlation samples such that error computation module 72 can derive a meaningful sampling error. For example, FIG. 4 shows a main correlation peak 80 and a pair of smaller correlation peaks 82 and 84 on either side of main correlation peak 80. If the OFDM signal was not oversampled by sampler 62, it is likely that only main correlation peak 80 would be present and error computation module 72 would not be able to determine a sampling error 86 derived from the magnitude of correlation peaks in the vicinity of main peak 80, as discussed in further detail below.

When the main peak of the correlation samples is detected, error computation module 72 analyzes correlation samples 82 and 84 on either side of main peak 80. When there is no sampling offset the frequency correlation samples 82 and 84 will have the same magnitude (not shown). However, if there is a sampling offset the correlation samples 82 and 84 will have different magnitudes, as shown in FIG. 4.

Computation module 72 computes an error value by calculating the difference in magnitude between the correlation samples 82 and 84 on either side of correlation peak 80. The difference in magnitude may be positive or negative.

The magnitude of the difference indicates the degree that the stored training sequence and the received training sequence are out of synch. The sign of the difference indicates whether to increase or decrease the sampling frequency. For a given sampling offset, the magnitude of the sample to the left of a main correlation peak (e.g., main peak index−1) minus the value of the sample to the right of the main correlation peak (e.g., main peak index+1) will produce the error value. Alternatively, the error value may be computed as the difference between the right sample and the left sample depending on the requirements of a particular system.

Returning to FIG. 3, error computation module 72 outputs the computed error value to a second order loop filter 74 that adjusts the sampling rate such that the sampling error is driven towards zero and the sampling rate of the receiver synchronizes with the sampling rate of the transmitter. More specifically, second order loop filter 74 adjusts the sampling rate of a sampler 78 via a conventional sampling rate converter 76 or, in the alternative, may adjust the sampling rate of sampler 78 and associated upsampler 62.

Referring now to FIG. 5, an integration of the present invention and conventional OFDM receiver 10 of FIG. 1, is shown. More specifically, sampling offset correction system 60 may be coupled to the outputs of mixers 28 and 30 and to the inputs of DSP 46. With this arrangement, sampling offset correction system 60 receives the in-phase and quadrature OFDM signals from mixers 28 and 30, digitizes the received signals at a corrected sampling rate that matches the sampling rate of the transmitter, and outputs the digitized signals to DSP 46 for further processing. It should be noted that LPF 42 and LPF 44 of FIG. 1 may be coupled to the outputs of sampling offset correction system 60 and to the inputs of DSP 46 for filtering the digitized OFDM signals although such an arrangement is not shown in FIG. 5.

Thus according to the principle of the present invention, there is provided a method of correcting a sampling offset in an OFDM receiver. The method includes sampling a received OFDM signal, the OFDM signal containing a reference symbol, correlating the sampled OFDM signal with a stored symbol, locating a correlation peak, calculating a difference in magnitude of correlation samples on either side of the correlation peak, and deriving a sampling offset error from the calculated difference.

While the present invention has been described with reference to the preferred embodiments, it is apparent that that various changes may be made in the embodiments without departing from the spirit and the scope of the invention, as defined by the appended claims.

What is claimed is:

1. A method of correcting a sampling offset in an Orthogonal Frequency Division Multiplexing (OFDM) receiver, the method comprising the steps of:
   sampling a received OFDM signal containing a reference symbol;
   correlating the sampled OFDM signal with a stored symbol;
   outputting a sequence of correlation samples representing the correlation of the stored symbol with the OFDM signal;
   determining the power of each correlation sample in the sequence;
   determining an index of the correlation peak by locating a correlation sample in the sequence of correlation samples having a maximum power value;
   calculating a difference in magnitude of correlation samples on either side of the correlation peak; and correcting a sampling offset in response to the calculated difference.

2. The method of claim 1, wherein the step of sampling includes oversampling the received OFDM signal by a predetermined factor.

3. The method of claim 2, wherein the step of correlating includes correlating the oversampled OFDM signal with a stored symbol that is oversampled by the predetermined factor.

4. The method of claim 3, wherein the predetermined factor is a factor of 2.

5. The method of claim 1, wherein the stored symbol is identical to the reference symbol.

6. The method of claim 1, wherein the stored symbol corresponds to a segment of the reference symbol.

7. The method of claim 6, wherein the stored symbol is a segment that is repeated periodically within the reference symbol.

8. The method of claim 1, wherein the sampling and correlation steps occur in the time domain.

9. The method of claim 1, wherein the step of determining the power of each correlation sample includes the step of computing a squared magnitude of each correlation sample.

10. The method of claim 1, wherein the step of determining the power of each correlation sample includes the step of obtaining a magnitude of each correlation sample.

11. An Orthogonal Frequency Division Multiplexing (OFDM) receiver for receiving an OFDM signal having a training symbol, the OFDM receiver comprising:
an analog-to-digital converter (ADC) that samples a received OFDM signal at a sampling rate to generate OFDM samples including a plurality of training symbol samples;
a training symbol detector coupled to the ADC, the training symbol detector detecting the location of a training symbol sample having a predetermined value within the OFDM samples and outputting an index of the located training symbol sample; and
a sampling offset unit coupled to the training symbol detector, the sampling offset unit generating a sampling offset error derived from a calculated difference in magnitude of training samples on either side of the index.

12. The OFDM receiver of claim 11, further comprising:
a correction unit coupled to the ADC and sampling offset unit, the correction unit adjusting the sampling rate of the ADC in response to the sampling offset error output from the sampling offset unit.

13. The OFDM receiver of claim 11, wherein the predetermined value is one of a maximum power value and a maximum magnitude value.

14. The OFDM receiver of claim 11, wherein the training symbol detector comprises:
a correlator coupled to the ADC, the correlator correlating the OFDM samples output from the ADC with a stored copy of the training symbol to generate a plurality of correlation samples; and
a correlation peak detector coupled to correlator, the correlation peak detector outputting an index of a correlation peak in response to the detection of a correlation peak in the plurality of correlation samples.

15. The OFDM receiver of claim 14, wherein the stored copy of the training symbol is a segment of the training symbol of the OFDM signal that is periodically repeated within the training symbol of the OFDM signal.

16. The OFDM receiver of claim 14, wherein the ADC oversamples the received OFDM signal by a predetermined factor such that a predetermined resolution of correlation samples are generated by the correlator.

17. The system of claim 16, wherein the system is incorporated into an OFDM receiver that operates in a wireless LAN.

18. A system for identifying a sampling offset in an Orthogonal Frequency Division Multiplexing (OFDM) receiver, the system comprising:
means for sampling a received OFDM signal containing a reference symbol;
means for correlating the sampled OFDM signal with a stored symbol to generate a sequence of correlation samples;
means for outputting a sequence of correlation samples representing the correlation of the stored symbol with the OFDM signal;
means for determining the power of each correlation sample in the sequence;
means for determining the index of the correlation peak by locating a correlation sample in the sequence of correlation samples having a maximum power value;
means for calculating a difference in magnitude of predetermined correlation samples in the vicinity of the correlation peak; and
means for deriving a sampling offset error from the calculated difference.

19. A method of correcting a sampling offset in an Orthogonal Frequency Division Multiplexing (OFDM) receiver, the method comprising the steps of:
receiving an OFDM signal having a training symbol;
sampling the received OFDM signal to generate OFDM samples including a plurality of training symbol samples;
detecting the location of a training symbol sample having a predetermined value;
outputting an index of the located training symbol sample;
calculating a difference in magnitude of training samples on either side of the index; and
generating a sampling offset error derived from the calculated difference.

20. An Orthogonal Frequency Division Multiplexing (OFDM) receiver for receiving an OFDM signal having a training symbol, the OFDM receiver comprising:
means for receiving an OFDM signal having a training symbol;
means for sampling the received OFDM signal to generate OFDM samples including a plurality of training symbol samples;
means for detecting the location of a training symbol sample having a predetermined value;
means for outputting an index of the located training symbol sample;
means for calculating a difference in magnitude of training samples on either side of the index; and
means for generating a sampling offset error derived from the calculated difference.

21. A system for identifying a sampling offset in an Orthogonal Frequency Division Multiplexing (OFDM) receiver, the system comprising:
an analog-to-digital converter (ADC) that samples a received OFDM signal containing a reference symbol and outputs OFDM samples including a plurality of training symbol samples;

a correlator coupled to the ADC, the correlator correlating the OFDM samples output from the ADC with a stored symbol and outputting a sequence of correlation samples representing the correlation of the stored symbol with the OFDM signal;

a power module coupled to the correlator, the power module determining the power of each correlation sample in the sequence;

a correlation peak detector coupled to the power module, the correlation peak detector determining an index of the correlation peak by locating a correlation sample in the sequence of correlation samples having a maximum power value;

an error computation module coupled to the correlation peak detector and power module, the error computation module calculating a difference in magnitude of correlation samples on either side of the correlation peak; and a correction unit coupled to the error computation module and ADC, the correction unit correcting a sampling offset in response to the calculated difference.

* * * * *